Figure 1:
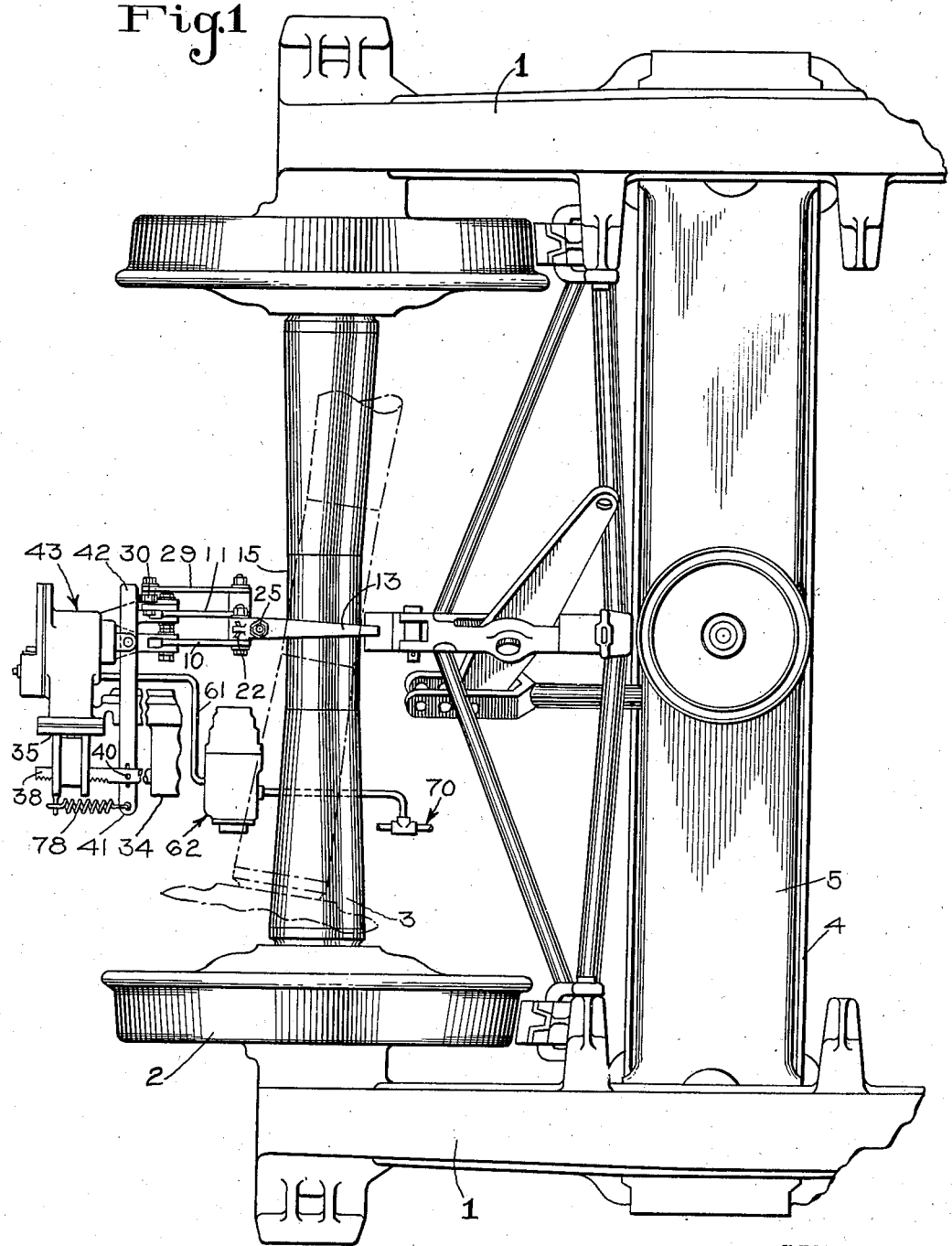

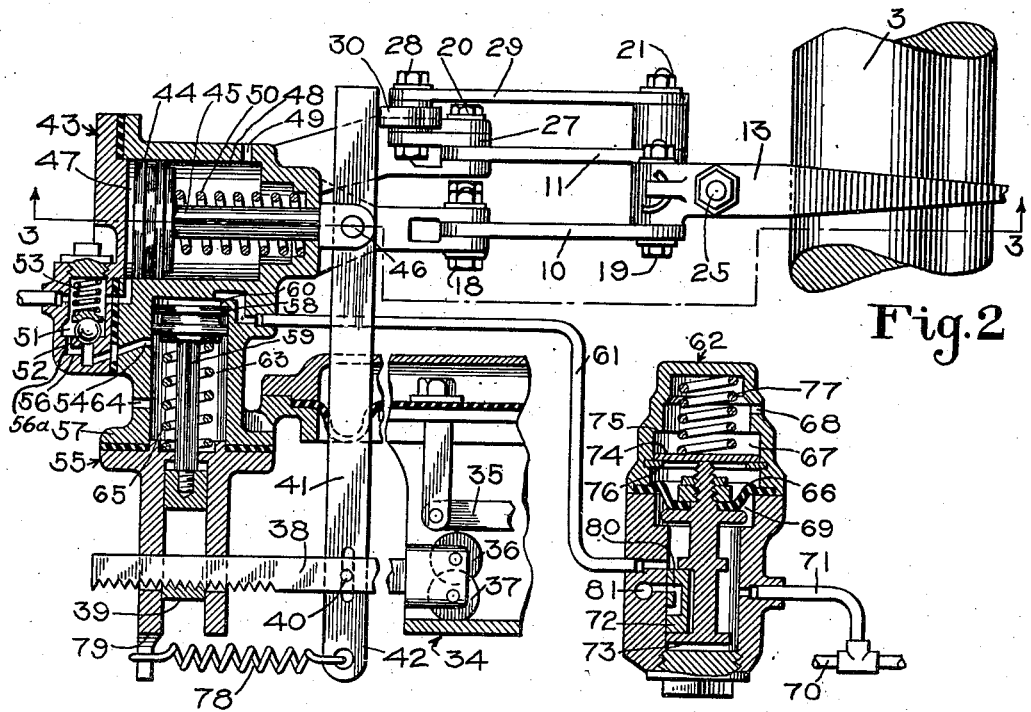
Fig.2
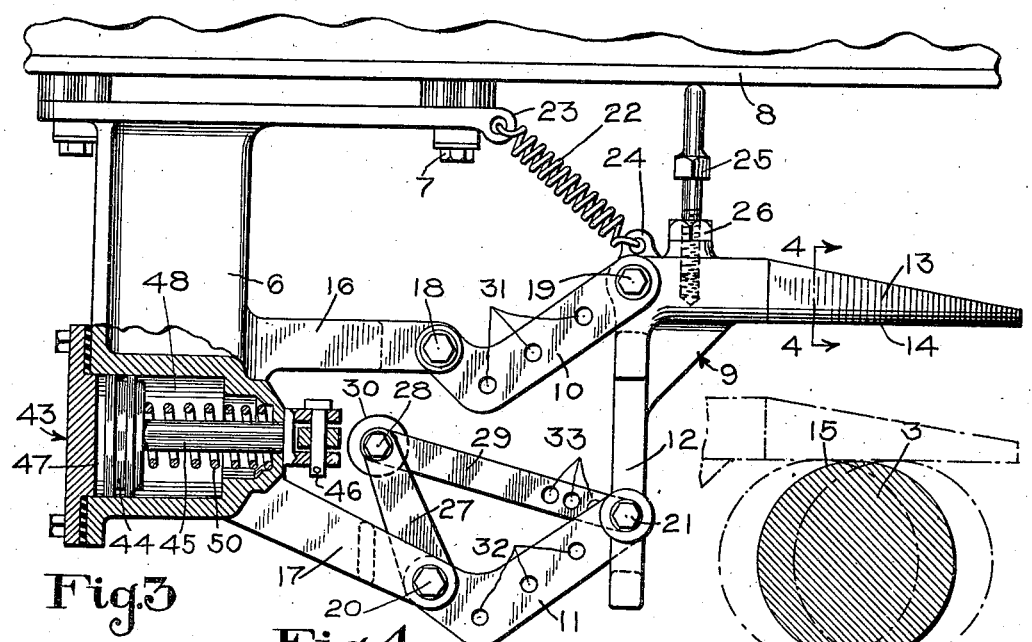
Fig.3
Fig.4
INVENTORS
CLAUDE A. NELSON
JOHN N. GOOD
ALBERT B. DESALARDI
BY
ATTORNEY

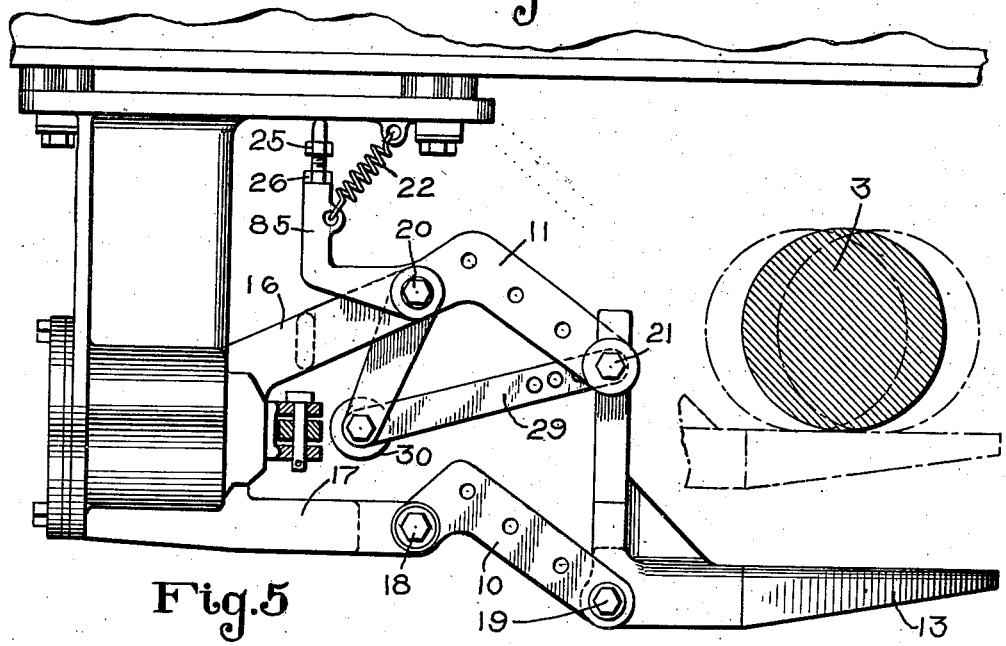
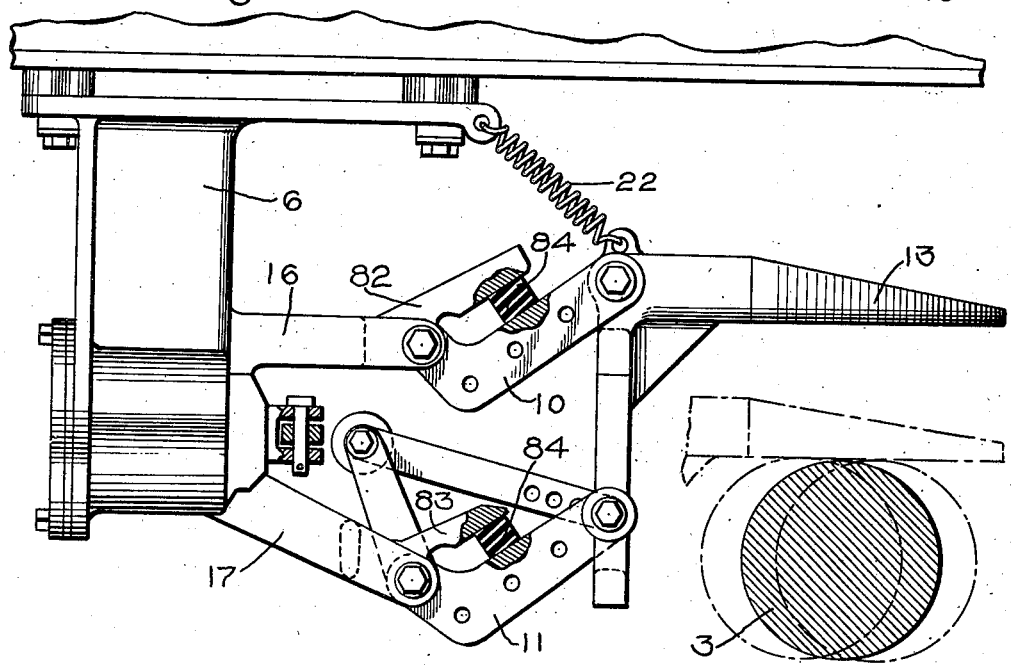

June 18, 1946.  C. A. NELSON ET AL  2,402,434
VARIABLE LOAD BRAKE APPARATUS
Filed Aug. 25, 1944  4 Sheets-Sheet 4

INVENTORS
CLAUDE A. NELSON
JOHN N. GOOD
BY ALBERT B. DESALARDI
ATTORNEY

Patented June 18, 1946

2,402,434

UNITED STATES PATENT OFFICE 2,402,434

VARIABLE LOAD BRAKE APPARATUS

Claude A. Nelson and John N. Good, Wilmerding, and Albert B. De Salardi, Wilkinsburg, Pa., assignors to The Westinghouse Air Brake Company, Wilmerding, Pa., a corporation of Pennsylvania Application August 25, 1944, Serial No. 551,200

7 Claims. (Cl. 188—195)

This invention relates to variable load brake apparatus for railway vehicles and more particularly to that portion thereof which measures the variable vertical distance between a sprung portion and an unsprung portion of the vehicle for the purpose of conditioning brake apparatus for operation to vary the degree of a brake application according to variations in the weight of the load carried by the vehicle.

Heretofore, the portion of the apparatus which functions to condition the apparatus for operation to provide various degrees of braking embodied means whereby one or more flexible connections were required between the car body and one or both of the car trucks, and also in many instances embodied means whereby sidewise tilt of the car body in either direction would render the conditioning or adjustment of the brake apparatus inaccurate. The flexible connections just referred to were usually in the form of mechanical linkage, chains, or cables and as such were subject to distortion and excessive wear due to road vibrations of the truck and therefore required frequent correcting adjustments to insure the attainment of the proper degree of braking called for by the weight of the lading carried. Such adjustment would of course have to be made manually by an experienced workman, but this is objectionable since the human element cannot be entirely relied upon to insure the frequent and proper adjustments to maintain the brake equipment in its proper operating condition.

The principal object of this invention is, therefore, to provide a novel apparatus mounted wholly on a sprung portion of a vehicle for accurately determining the change in the vertical distance between a sprung portion and an unsprung portion, which change is the result of a change in the load on the vehicle and to adjust many well known variable load brake mechanisms accordingly.

Another object of the invention is to provide an apparatus of the above type and to arrange the apparatus in such a manner that it does not maintain a continuous operative connection with the vehicle truck, and that it will function to accurately adjust the variable load brake mechanism regardless of the angular position the truck and car body may assume relative to each other in either a horizontal or vertical plane.

Another object of the invention is to provide an apparatus of the above type which is composed of few parts.

Another object is to provide an apparatus of the above-mentioned type in which load weighing is obtained without modification of the vehicle body or the truck members and which is so constructed and arranged on the vehicle that it may be used without change on modern designs of railway vehicles where the clearance between the truck and vehicle body is very limited.

A further object is to provide an apparatus of the above type which is free from wear due to vibrations originating in the truck.

Other objects and advantages will appear in the following more detailed description of the invention.

The objects above set forth are attained by the use of an apparatus which is mounted entirely on the body of the vehicle, preferably on the center sill, and which is constructed and arranged in such a manner as to function to engage or contact the top or bottom of an axle of a wheel and axle assemblage, or the top or bottom of a central portion of a transversely extending member rigidly carried by a relatively fixed part of the truck assemblage of the vehicle truck to condition the brake equipment according to the position the vehicle body assumes vertically with relation to the axle and regardless of the angular position which the body and/or truck may assume relative to each other in either a horizontal or a vertical plane.

According to the invention the apparatus comprises a measuring element having a measuring leg for contact or engagement with the axle of the wheel and axle assemblage or with any other transversely extending relatively fixed truck part, which leg, when in contact with the top or bottom of the axle or other fixed truck part, intersects the vertical center plane of the axle or fixed truck part. The apparatus also comprises a mechanism operative for moving the measuring arm into contact with the contact surface of the axle within a zone located between the ends of the axle, which mechanism always positions the measuring leg so that the tangential plane to the contacting surface thereof is at all times parallel with the horizontal center plane of the axle or other relatively fixed part of the truck when the vehicle is on a horizontal track portion and is centrally loaded.

The degree of measuring travel of the measuring leg and thereby the conditioning of the brake equipment will depend upon the different positions the body may assume vertically relative to the axle or other relatively fixed part of the truck under different degrees of body load.

Figure 8:
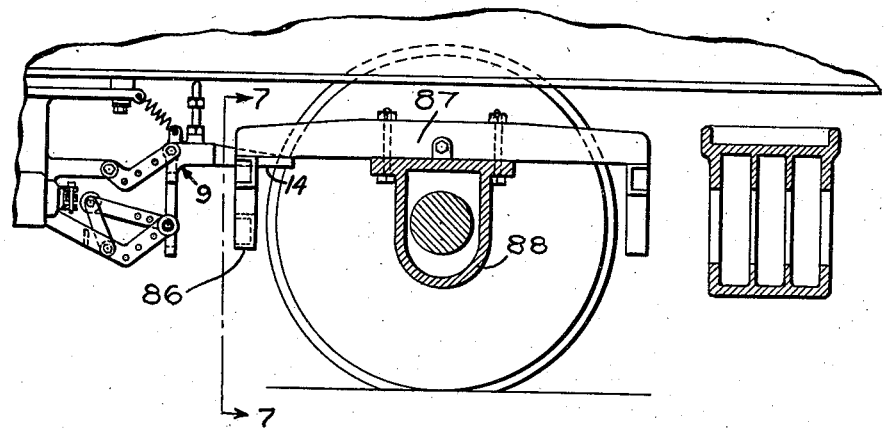
Figure 7:
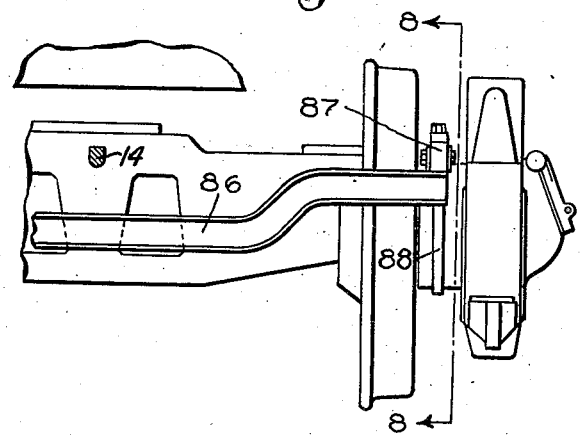

In the accompanying drawings Fig. 1 is a plan view of one form of the measuring apparatus of a portion of a railway vehicle truck with which the apparatus is associated, portions of the mechanism which are controlled by the apparatus, and not essential to a clear understanding of the invention, being broken away or omitted; Fig. 2 is an enlarged plan view, partly in horizontal section of the same, only a portion of an axle of the truck being shown; Fig. 3 is a side elevational view of the same, partly in vertical section, and illustrating a portion of a vehicle body, the section being taken on the line 3—3 of Fig. 2 and Fig. 4 is a cross sectional view through the measuring leg on the line 4—4 of Fig. 3; Fig. 5 is a side elevational view corresponding closely to Fig. 3 and illustrating another form of the invention; and Fig. 6 is a similar side elevational view illustrating still another form of the invention. Fig. 7 is an end elevational view of a railway car truck having a transverse member rigidly secured at each end to a journal box, the measuring leg of the invention being shown in cross section; and Fig. 8 is a longitudinal sectional view of the same taken on the line 8—8 of Fig. 7, the measuring apparatus being shown in elevation.

In the drawings the measuring mechanism, constructed in accordance with the invention, is shown associated with a railway vehicle variable load fluid pressure brake equipment of the type described and claimed in an application for U. S. Letters Patent of Earle C. Cook, filed July 26, 1944, serially numbered 546,650, for a Variable load brake, which measuring mechanism and equipment is wholly carried by the body of the vehicle. The measuring mechanism, as will be hereinafter fully described, is arranged to cooperate with an axle or other relatively fixed part of a truck of the vehicle.

The vehicle body may be of the passenger, freight or tender type and the trucks for carrying the body may each be of any desired construction. In Fig. 1 a usual or well known type of truck is illustrated which comprises laterally spaced side frames 1 which are rigidly carried by wheel and axle assemblages, each assemblage comprising wheels 2 and an axle 3. The truck may also comprise a spring plank 4 which extends between and is rigidly carried by the side frames and upon which are seated the usual springs (not shown) which in turn resiliently support a truck bolster 5. In some of the more recent trucks of this type the spring plank is omitted and the truck springs are carried directly by the truck frames.

As best shown in Figs. 2 and 3 the measuring mechanism comprises a supporting bracket 6 which is secured by bolts 7 to the under side of the center sill 8 of the vehicle body. As shown in Fig. 3 shock absorbing cushions, preferably made of rubber are interposed between the bracket and the center sill. Operatively carried by this bracket is a jointed linkage which comprises a measuring element 9 and a pair of vertically spaced like links 10 and 11 which operatively connect the element 9 to the bracket. The measuring element 9 is preferably of inverted L-shape having a vertically depending leg 12 and a horizontally disposed leg 13 which is disposed directly above and normally spaced away from the axle 3 of a truck a sufficient distance that it will not come into contact with the axle when, due to uneven track or any other reason, the body moves vertically downward relative to the axle. As will hereinafter be described the measuring member is however movable into contact with the axle when the fluid pressure brake mechanism is being conditioned for braking, that is to say, when the brake equipment is being charged or recharged with fluid under pressure.

The measuring mechanism is preferably so located inwardly of the usual pivotal connection between the vehicle body and truck, and laterally of the vehicle, that the longitudinal vertical center planes of leg 13 and axle 3 are preferably substantially perpendicular to each other when the vehicle is on a straight section of track.

The leg 13 of the measuring element is provided with a surface 14, the contacting straight line of which surface, as will hereinafter be described, is at all times maintained parallel to the horizontal center plane of the axle or other fixed part of the truck. This surface is preferably rounded as best shown in Fig. 4 and is provided for the purpose of contacting the outer surface of the axle 3 and more particularly the outer surface of that portion of the axle which is of even cross-section and which extends a short distance on both sides of the transverse center plane of the axle, which portion is indicated by the reference numeral 15.

The bracket 6 adjacent its lower end is provided with vertically spaced lugs 16 and 17 which extend outwardly from the bracket in the direction toward the measuring element. One end of the link 10 is pivotally connected to the end of the lug 16 by means of a bolt 18, the other end of the link being pivotally connected by means of a bolt 19 to the leg 12 of the measuring element as shown, the connection is at substantially the juncture of the legs 12 and 13 but this is not essential since the connection may be made at any desired location along the leg. One end of the link 11 is pivotally connected to the end of the lug 17 by means of a bolt 20, the other end of the link being pivotally connected to the leg 12 by means of a bolt 21. It should here be mentioned that the lugs 16 and 17 and links 10 and 11 are, for the purpose of illustration, shown offset from each other laterally of the vehicle body, but the axes of the pivotal connections at each end of the links are in vertical alignment with each other and that the distance between the aligned connections at one end of the links is the same as that between the aligned connections at the other ends of the links, so as to maintain the contact line of the surface 14 parallel to the horizontal center plane of the axle 3 throughout its zone of movement toward and away from the axle. Since the surface 14 is rounded and the contact line thereof is maintained parallel with the horizontal center plane of the axle, there will be only a point contact between the arm and the top of the portion 15 of the axle. By reason of this point contact with the top of the axle, sidewise tilt of the vehicle or axle 3 relative to each other will not materially affect the vertical travel of the measuring element. It will be noted that the axes of the four bolts 18, 19, 20 and 21 traverse the four corners of a parallelogram.

For normally maintaining the measuring element out of engagement with the axle 3 a coil spring 22 is provided which is secured at one end to a lug 23 carried by the securing flange portion of the bracket 6 and which is secured at the other end to a lug 24 carried by and extending upwardly from the leg 13 of the measuring element. The leg 13 of the measuring element is provided with an upwardly extending stop member 25, the upper end of which is adapted to engage with the bottom of the center sill 8 to limit upward movement of the element relative to the vehicle body. The lower end of this stop member has screw-threaded connection with the leg 13 and is therefore adjustable vertically relative to the leg, the adjustment being accomplished by rotating the member relative to the leg. The stop member is retained in its adjusted position by means of a check nut 26 which has screw-threaded connection with the member and which engages a boss extending upwardly from the leg. The spring 22 in this form of the invention acts to urge the stop member against the center sill with sufficient force to prevent their separation by vibration during travel, thereby preventing rattling and wear of the pins, bearings and links of the apparatus.

For the purpose of effecting the operation of the measuring element a linkage is provided comprising a supporting member 27 which is pivotally carried at its lower end by the bolt 20. The upper end of the member 27 is pivotally connected by means of a bolt 28, with the adjacent end of an actuating link 29, the opposite end of which actuating link is pivotally mounted on the bolt 21. Interposed between the adjacent ends of the member 27 and link 29 is a roller 30 which is rotatably mounted on the bolt 28. This linkage is actuated by the variable load brake apparatus hereinbefore mentioned and hereinafter described in more detail.

The link 10 is provided with a series of spaced holes 31 and the link 11 is provided with a corresponding series of holes 32. These holes 31 and 32 are for the reception of the bolts 19 and 21, respectively, when for any reason it is desired to change the normal vertical travel of the measuring element. Thus, if it is desired to shorten the normal vertical travel the measuring element would be moved toward the left hand and the bolts 19 and 21 would be passed through the desired holes immediately to the left of those used in the showing in Fig. 3.

The end portion of the link 29 that is shown pivotally mounted on the bolt 21 is provided with a series of holes 33 for the reception of bolt 21. These holes are provided for the purpose of adjusting the effective length of the link 29 when the effective lengths of the links 10 and 11 are varied by passing the bolts 19 and 21 through the holes 31 and 32, respectively, of the links.

The measuring mechanism hereinbefore described may be associated with different types of variable load brake equipments, but as shown is particularly adapted for association with a variable load fluid pressure brake equipment of the type disclosed in the aforementioned Cook application.

As shown in the drawings this variable load fluid pressure brake equipment comprises a load compensating valve mechanism 34 which functions under the control of a scale beam 35 to control the flow of fluid to and from the brake cylinders, the fulcrum being in the form of rollers 36 and 37 which are shiftable along the scale beam by means of a positioning bar 38 having teeth provided on one edge of the outer end thereof which are adapted to be engaged by a correspondingly toothed lock member 39 for locking the bar and thereby the fulcrum against movement relative to the scale beam.

This fulcrum positioning bar is operatively connected by means of a pin 40, with the arm 41 of a horizontally disposed operating lever 42, the roller 30 of the measuring mechanism being adapted to serve at certain times as the fulcrum for the lever.

The operation of the lever 42 is controlled by the operation of a fluid pressure controlled piston device 43 having a cylinder casing which is formed integral with the bracket 6. Contained in this cylinder casing is a piston 44 having a stem 45 which is operatively connected, by means of a pin 46, with the lever 42 at a point located between the roller 30 and pin 40 but preferably closer to the roller than to the pin. At one side of the piston is a fluid pressure chamber 47 and at the other is a non-pressure chamber 48 which is open to the atmosphere through a passage 49 and which contains a coil spring 50 that operatively seats on the piston and the non-pressure head of the cylinder casing.

The chamber 47 as shown is in constant open communication with a valve chamber 51 containing a ball check valve 52 which as shown, is biased toward its seating position by the action of a coil spring 53 contained in chamber 51. At the under side of the check valve there is a passage 54 which leads to a piston device 55 which is operative to actuate the locking member 39 into or out of locking engagement with the fulcrum positioning bar 38. Extending around the ball check valve is a by-pass passage 56 which by reason of the choke 56a is of lesser flow area than that of the passage and pipe 61 and which is provided to insure a certain locking operation which will be later described.

The piston device 55 comprises a piston casing 57 containing a piston 58 having a stem 59 which is rigidly secured to the locking member 39. At one side of the piston 58 there is a fluid pressure chamber 60 which is in constant open communication with a passage and pipe 61 leading from a cut-off valve device 62. At the other side of the piston there is a non-pressure chamber 63 which is constantly open to the atmosphere through a passage 64 and which contains a coil spring 65. This spring engages the piston and the non-pressure head of the cylinder and acts at all times to bias the piston toward the position in which it is shown in Fig. 2. With the piston in this position the passage 54 is open to the non-pressure chamber 63 and thereby to the atmosphere.

The cut-off valve device 62 may comprise a casing in which there is mounted a flexible diaphragm 66, at one side of which there is a chamber 67 which is in constantly open communication with the atmosphere by way of a passage 68 and at the other side of which there is a valve chamber 69 which is in constantly open communication with a brake pipe 70 by way of a connected pipe and passage 71. Contained in the chamber 69 is a slide valve 72 which is arranged to be operated by a stem or follower 73 operatively secured to the flexible diaphragm 66. Slidably mounted in the chamber 67 is a stop member 74 which is arranged to abut either a shoulder 75 formed in the wall of the chamber to limit the upward movement of the member or a ring 76 expanded into an annular groove in said wall to limit the downward movement of the member. Interposed between and operatively engaging the member 74 and a top wall of the chamber 67 is a spring 77 which, at all times, tends to move the member in a downwardly direction.

Operation of the apparatus shown in Figs. 1 to 4 inclusive

Since the invention resides in the measuring apparatus and for illustrative purposes has been combined with the type of variable load brake equipment shown, described and claimed in the aforementioned Cook application, the following description of the operation of the apparatus will be directed particularly to the measuring feature with only so much of the description of the variable load brake equipment as is deemed necessary to a clear understanding of the invention.

Assuming the equipment to be at atmospheric pressure, the slide valve 72 of the cut-off valve device 62 will be in the position in which it is shown in Fig. 2 in which the pipe and passage 61 is connected to the slide valve chamber 69, said valve being maintained in this position by the spring 77 through the medium of the stop member 74 and the stem 73.

In initially charging the equipment, fluid under pressure supplied to the brake pipe 70 flows in the usual manner to the several chambers and reservoirs of the brake controlling valve device, (not shown) but which may be of the AB type and which are to be charged, and also by way of pipe and passage 71 to the slide valve chamber 69 of the cut-off valve device 62. With the slide valve 72 in its lowermost position, fluid under pressure flows from the valve chamber 69 to the pipe 61 and thence to the chamber 60 of the locking mechanism. On an increase in the pressure of fluid in this chamber to a predetermined value, the piston 58 is moved against the opposing pressure of the spring 65 and effects the movement of the locking member 39 out of engagement with the toothed portion of the fulcrum positioning bar 38, thus permitting a spring 78 which is secured at one end to a lug 79 rigidly carried by the cylinder casing of the locking mechanism and which is secured at the other end to the end of the lever adjacent the fulcrum positioning bar 38, to move this end of the lever 42 to the position in which it is shown in Fig. 2 if it is not already in this position.

When the piston 58, in its downward travel, passes the mouth of the passage 54 communication is established between chamber 60 and said passage. Fluid will now flow from chamber 60 through passage 54 and past ball check valve 52 into check valve chamber 51 and from thence flows to chamber 47 and thus to the face of piston 44 of the piston device 43. In response to the pressure of this fluid, piston 44 will move to the right against the opposing pressure of spring 50, which movement is transmitted through the medium of the piston stem 45 and the pin 46 to the connected end of the lever 42, causing the lever to rock clockwise about the pin 40. As the lever rocks in this direction it engages the roller 30, thereby causing the connected members 27 and 29 to rock clockwise as viewed in Fig. 3 about the bolts 20 and 21, respectively. Since member 29 is mounted on the bolt 21 carried by the leg 12 of the measuring element 9, links 10 and 11 which are mounted on the bolts 19 and 21, respectively, will rotate clockwise about pins 18 and 20, respectively, carrying therewith the measuring element 9 against the opposing force of spring 22 until the contact portion of surface 14 of the leg 13 engages the portion 15 of the axle 3. As shown in dot and dash lines in Fig. 3 the contact points of the measuring element and axle lie in substantially the same horizontal plane regardless of angular movement of the axle relative to the vehicle body.

When the movement of the element 9 is stopped by the axle 3, the roller 30 cannot be moved further by the lever 42 and therefore serves as a fulcrum for the lever. With the lever thus fulcrumed the piston 44, as it continues to move, causes the lever to rock counter-clockwise, as viewed in Fig. 2, about the point of engagement between the lever 42 and the roller 30.

It will be apparent that as the degree of movement of the measuring element 9 becomes less, the displacement of the fulcrum rollers 36 and 37 will become greater, thereby shifting the fulcrum point further, along the scale beam 35 of the variable load mechanism 34. Since the center sill 8 moves downwardly as the load on the vehicle increases thereby reducing the degree of movement of the element 9, the distance the fulcrum for the beam 35 is shifted increases as the load increases, thus conditioning the brake equipment for operation to provide the degree of braking called for by the weight of the lading carried.

Now when the pressure of fluid in the valve chamber 69 of the cut-off valve device 62 has increased to around thirty pounds, the diaphragm 66 will be caused to flex upwardly against the opposing pressure of the spring 77, said diaphragm as it is thus flexed acting through the medium of the stem 73 to shift the slide valve 72 upwardly to its uppermost position, in which position a passage 80 in the valve connects pipe and passage 61 to a passage 81 which leads to atmosphere. With this connection thus established, fluid under pressure flows from the piston chambers 47 and 60 which are connected together by way of the by-pass passage 56, the ball check valve 52 being seated at this time. Passage 56 because of a choke 56a located therein being of more restricted flow capacity than pipe and passage 61, the pressure of fluid in chamber 60 will reduce more rapidly than that in chamber 47 and when slightly less than that of spring 65 (say twenty pounds), said spring acts to shift the piston 58 upwardly bringing the locking member 39, through the medium of the stem 59, into locking engagement with the toothed portion of the bar 38.

With piston 58 in its uppermost position, passage 54 is connected to atmosphere by way of chamber 63 with atmospheric passage 64 therein. Fluid under pressure flows from chamber 47 to chamber 51 and thence by way of passages 56 and 54, chamber 63, and passage 64 to atmosphere. It should be noted that because of the choke 56a the locking mechanism is always operated to lock the bar 38, and thereby fulcrum 36, 37, in their adjusted position before the piston device 43 permits the spring 22 to retract the element 9 from engagement with the portion 15 of the axle 3.

Description of the apparatus shown in Fig. 5

The measuring mechanism shown in Fig. 5 differs from that shown in Figs. 1 to 4 inclusive, in that the stop member 25 is omitted and other stop means added which are arranged to engage the links 10 and 11.

As shown, the stop means comprises stop lugs 82 and 83 which in this embodiment of the invention are rigidly carried by the lugs 16 and 17, respectively, of the bracket 6, which lugs preferably have bonded thereto resilient stop members 84 preferably made of rubber with which the upper edge surface of the links 10 and 11 are adapted to engage under the influence of the spring 22.

Aside from the stopping of the links 10 and 11 by the stop means carried by the bracket 6, the operation of this form of the invention is identical with that of the form of the invention shown in Figs. 1 to 4 inclusive.

*Description of the apparatus shown in Fig. 6*

In Fig. 6 another form of the invention is illustrated in which the measuring element is of L-shape and is arranged to engage with the bottom of the axle or other relatively fixed part of the vehicle truck, instead of being of inverted L-shape and engaging with the upper surface of the axle or other relatively fixed part of the truck as shown in Figs. 1 to 5 inclusive.

In this form of the invention the cross sectional shape of the measuring leg of the measuring element is the same as that shown in Fig. 4, except that it is inverted, that is to say, the rounded surface 14 is at the top of the leg 13. To move the measuring element upwardly so that the contact point of the surface 14 engages with the axle 3, a mechanism is employed similar to that in the hereinbefore mentioned forms with the notable difference that the links 10 and 11 as well as the measuring element 9 are reversed as shown. Also, the stop member 25 is carried by an arm 85, formed integrally with the link 11, in a manner so as to carry the stop member into engagement with the upper portion of the bracket 6 for limiting clockwise movement of the link 11 under the influence of the spring 22.

With the exception that the measuring element moves upwardly into engagement with the bottom of the axle 3, the operation is substantially the same as described in connection with the apparatus shown in Figs. 1 to 3 inclusive.

*Description of the arrangements shown in Figs. 7 and 8*

In Figs. 7 and 8 we have illustrated an application of our novel measuring mechanism to a vehicle having a truck in which there is a relatively fixed part 86 which extends transversely of the truck and which is rigidly supported at each side of the truck by a longitudinally extending member 87 which is rigidly secured to a journal box 88 of the truck.

The measuring mechanism shown in Figs. 7 and 8 is the same that illustrated in Figs. 1 to 4 inclusive and functions in the same manner as described in connection with these figures.

From the above description it will be understood that any of the other illustrated forms of the invention may be substituted for the one shown in Fig. 8.

While the invention has been described in connection with a variable load brake of the type shown, described and claimed in the aforementioned Cook application, it will be understood that it may be used in connection with other types of variable load brake mechanism.

Having now described our invention, what we claim as new and desire to secure by Letters Patent is:

1. A measuring mechanism for a load compensating brake equipment for a vehicle having a sprung body part and an unsprung truck part which is capable of angular movement in a horizontal plane relative to the sprung part, said measuring mechanism being wholly carried by said sprung body part comprising means including an arm movable into engagement with a peripheral surface of the unsprung truck part at a point in the vertical center plane through said part regardless of the angular position of the unsprung truck part with relation to said sprung body part for conditioning the brake equipment for operation to provide the braking called for by the load and means for actuating said member to engage said unsprung truck part.

2. In a combination with a vehicle brake mechanism having a member adjustable for varying the vehicle braking force according to the position to which said member is adjusted, lever means mounted on a sprung portion of the vehicle adjacent an axle of the vehicle and operatively connected to said member for adjusting said member according to the relative vertical distance between said axle and said sprung portion, said means having a member which is operable into engagement with the central portion of said axle for determining the relative vertical distance between said axle and said sprung portion and which is maintained parallel to the horizontal center plane of the axle at all times, and means for actuating said lever means.

3. In a device for measuring the relative change in the vertical distance between a sprung and an unsprung portion of a vehicle, the combination with an axle having a cylindrical portion, of a measuring element having a surface which is in substantially parallel relation with the horizontal center plane of said axle, means for moving said surface into engagement with said cylindrical portion at a point where the vertical center plane therethrough will intersect the periphery of said portion; said means being effective to maintain said parallel relation at all times, a member associated with said lever means and operable thereby to indicate the degree of vertical movement of said element, and means for actuating said lever means.

4. A measuring mechanism for a load compensating brake equipment of a vehicle of the type having an unsprung truck part and a sprung body part movable vertically relative to the unsprung truck part in response to differences in the weight imposed thereon and said unsprung truck part being capable of angular movement in a horizontal plane relative to said sprung body part, said measuring mechanism being wholly carried by said sprung body part and comprising a measuring element movable with said sprung body part relative to said unsprung truck part and being movable vertically relative to said sprung body part into stopping engagement with said unsprung truck part at the point where a line drawn vertically through the axis of the unsprung truck part intersects the periphery of the unsprung truck part regardless of the angular position of the unsprung truck part with relation to said sprung body part and measuring element, and means operative to actuate said measuring mechanism and to condition said brake equipment according to the degree of movement of said measuring element for operation to provide the degree of braking called for by the weight carried by the sprung part.

5. A measuring mechanism for a load compensating brake equipment of a vehicle of the type having an unsprung part and a sprung part movable vertically relative to the unsprung part in response to differences in the weight imposed thereon and said unsprung part being capable of angular movement in a horizontal plane relative to said sprung part, said measuring mechanism comprising a measuring element carried by said sprung part and having an arm extending transversely across said unsprung part and normally maintained spaced away from the unsprung part and in a parallel relation to the horizontal center plane of said unsprung part, said element being movable vertically with said sprung part relative to said unsprung part and being movable vertically relative to said sprung part into stopping engagement with said unsprung part at the point where a line drawn vertically through the axis of said unsprung part intersects the periphery of the unsprung part regardless of the angular position of the unsprung part with relation to the sprung part and said arm, apparatus carried by said sprung part operative to move said measuring element relative to said sprung part and to maintain the element so positioned as it is being moved that said arm will remain in parallel relation to the horizontal center plane of said unsprung part, and means operative to actuate said measuring mechanism and to condition said brake equipment according to the degree of movement of the measuring element for operation to provide the degree of braking called for by the weight carried by the sprung part.

6. A measuring mechanism for a load compensating brake equipment of the vehicle of the type having an unsprung part and a sprung part movable vertically relative to the unsprung part in response to variation of the weight imposed thereon and said unsprung part being capable of angular movement in a horizontal plane relative to said sprung part, said measuring mechanism comprising a measuring element carried by said sprung part and having an arm extending transversely across said unsprung part and normally maintained spaced away from the unsprung part and in parallel relation to the horizontal center plane of said unsprung part, a spring interposed between and secured to said element and a fixed part of said sprung part for normally maintaining said measuring element spaced away from the unsprung part, said element being movable vertically with said sprung part relative to said unsprung part and being movable vertically relative to said sprung part into stopping engagement with said unsprung part at the point where the line drawn vertically through the axis of said unsprung part intersects the periphery of the unsprung part regardless of the angular position of the unsprung part with relation to the sprung part and said arm, apparatus carried by said sprung part operative to move said measuring element relative to said sprung part to maintain the element so positioned as it is being moved that said arm will remain in parallel relation to the horizontal center plane of the unsprung part, and means operative to actuate said measuring mechanism and to condition said brake equipment according to the degree of movement of the measuring element for operation to provide the degree of braking called for by the weight carried by the sprung part.

7. A measuring mechanism for a load compensating brake equipment of the vehicle of the type having an unsprung part and a sprung part movable vertically relative to the unsprung part in response to variations in the weight imposed thereon and said unsprung part being capable of angular movement in horizontal plane relative to said sprung part, said measuring mechanism comprising a measuring element carried by said sprung part and having an arm extending transversely across the unsprung part and normally maintained spaced away from the unsprung part and in parallel relation to the horizontal center plane of the unsprung part, a stop member carried by said element and engaging said sprung part for spacing said arm away from the sprung part, said element being movable vertically with said sprung part relative to said unsprung part and being movable vertically relative to said sprung part into stopping engagement with said unsprung part at the point where lines drawn vertically through the axis of said unsprung part intersect the periphery of the unsprung part regardless of the angular position of the unsprung part with relation to said sprung part and said arm, apparatus carried by said sprung part operative to move said measuring element relative to said sprung part and to maintain the element so positioned as it is being moved that said arm will remain in parallel relation to the sprung part, and means operative to actuate said measuring mechanism and to condition said brake equipment according to the degree of movement of the measuring element for operation to provide the degree of braking called for by the weight carried by the sprung part.

CLAUDE A. NELSON.
JOHN N. GOOD.
ALBERT B. DE SALARDI.